United States Patent
Kasbarian et al.

(10) Patent No.: US 8,296,016 B2
(45) Date of Patent: Oct. 23, 2012

(54) METHOD FOR CORRECTING MEASUREMENTS OF THE TORQUE EXERTED ON A STEERING WHEEL OF AN AUTOMOBILE VEHICLE ELECTRIC POWER-ASSISTED STEERING

(75) Inventors: Jean-Marc Kasbarian, Lyons (FR); Christophe Ravier, Lyons (FR)

(73) Assignee: Koyo Steering Europe (K.S.E.), Irigny (FR)

( * ) Notice: Subject to any disclaimer, the term of this patent is extended or adjusted under 35 U.S.C. 154(b) by 0 days.

(21) Appl. No.: 12/923,664

(22) Filed: Oct. 1, 2010

(65) Prior Publication Data

US 2011/0040449 A1 Feb. 17, 2011

Related U.S. Application Data

(63) Continuation of application No. 11/666,208, filed as application No. PCT/FR2005/002296 on Sep. 16, 2005, now abandoned.

(30) Foreign Application Priority Data

Oct. 26, 2004 (FR) .................................... 04 11398

(51) Int. Cl.
*A01B 69/00* (2006.01)
(52) U.S. Cl. ............ 701/41; 701/42; 180/443; 180/446; 180/6.2; 180/234; 180/408; 180/410; 180/412; 180/413; 280/735

(58) Field of Classification Search .................... 701/41, 701/42; 180/446, 443, 412, 413, 234, 408, 180/410; 280/735
See application file for complete search history.

(56) References Cited

U.S. PATENT DOCUMENTS

| | | | |
|---|---|---|---|
| 6,240,349 B1 * | 5/2001 | Nishimoto et al. | 701/41 |
| 6,647,330 B1 * | 11/2003 | Gluch | 701/41 |
| 6,854,560 B2 * | 2/2005 | Nishiyama et al. | 180/446 |
| 6,983,817 B2 * | 1/2006 | Katou et al. | 180/446 |

FOREIGN PATENT DOCUMENTS

| | | |
|---|---|---|
| EP | 0 546 789 A2 | 6/1993 |
| EP | 1 184 258 A2 | 3/2002 |
| EP | 1 378 420 A2 | 1/2004 |

* cited by examiner

*Primary Examiner* — Redhawn K Mawari
(74) *Attorney, Agent, or Firm* — Oliff & Berridge, PLC

(57) ABSTRACT

The method consists of, when the instantaneous speed of the vehicle is greater than a pre-determined threshold: identifying that the vehicle travels in a straight line without torque exerted on the steering wheel; if the prior condition is met, determining an average residual torque for the steering wheel by calculating a sliding scale of measures of torque on the steering wheel; calculating a correction, if the average residual torque on the steering wheel is greater than a pre-determined minimum torque, which is proportional to the average residual torque to be applied to the torque measures on the steering wheel; calculating effective correction limited in terms of the speed of variation and amplitude in relation to the correction applied to the measures of torque on the steering wheel, said corrected measures being subsequently treated by the electronic calculator in order to control the electronic booster motor.

6 Claims, 3 Drawing Sheets

METHOD FOR CORRECTING MEASUREMENTS OF THE TORQUE EXERTED ON A STEERING WHEEL OF AN AUTOMOBILE VEHICLE ELECTRIC POWER-ASSISTED STEERING

This is a Continuation of application Ser. No. 11/666,208 filed Jun. 8, 2007, which in turn is a National Phase of PCT/FR2005/02296 filed Sep. 16, 2005, which claims the benefit of French Patent Application No. 04.11398 filed Oct. 16, 2004. The disclosures of the prior applications are hereby incorporated by reference herein in their entirety.

The present invention relates, in general, to motor vehicles equipped with electric power-assisted steering. More particularly, this invention relates to a method for correcting measurements of the torque exerted on a steering wheel of an automobile vehicle electric power-assisted steering.

In a generally known manner, a vehicle with electric power-assisted steering comprises an assistance electric motor, with two rotation directions, whose exit shaft is usually coupled, via a speed-reducer gearing for example a worm screw and gear wheel, to the steering column of the vehicle, so as to transmit a motor torque (which could also be a resisting torque) to this steering column. The assistance torque is itself communicated, via the mechanical part of the steering, generally of the rack and pinion type, to the two drive wheels of the vehicle in question, so as to orient them with a view to turning right or left, or to a straightening up. Electric power-assisted steering systems are also known with power-assistance systems acting on the rack rail; in such systems, the assistance electric motor is coupled, for example, to a reducer of the ball screw type which transmits the assistance effort directly to the rack rail.

The assistance electric motor is controlled by an on-board electronic processor, which receives various input signals and which processes them, in such a manner as to control, at every moment, the assistance electric motor in an optimized manner. The input quantities thus used in the processor for the electric power-assisted steering regulation are, in particular, the instantaneous angular position of the steering wheel of the vehicle, and/or of the assistance electric motor, the torque exerted by the driver on the steering wheel, and the instantaneous speed of the vehicle. The processor may also use other parameters, deduced by a calculation, for example the speed of rotation of the steering wheel obtained as a derivative, with respect to time, of the angle of the steering wheel.

With regard, more particularly, to the torque exerted by the driver on the steering wheel, the torque measurement is usually carried out, when the vehicle is being driven, by a torque sensor which remains complex to implement and to calibrate, this sensor generally being disposed on the steering column. The information supplied by such a sensor is processed by the on-board processor, in order to determine the setpoint for the torque that the assistance electric motor must apply in the course of a turn.

However, it is observed that the operating conditions, for example temperature conditions, can affect the torque sensor on the steering wheel and lead to a drift, temporary or permanent, in the assistance torque setpoint introduced by the on-board processor for controlling the assistance function.

The present invention aims to eliminate this drawback, by providing a real-time correction method for the measurements of the torque on the steering wheel of an automobile vehicle electric power-assisted steering which guarantees an assistance function without drift, in other words symmetrical between turning to the right and to the left.

For this purpose, the subject of the invention is a method for correcting the measurements of the torque exerted on a steering wheel of an automobile vehicle electric power-assisted steering, carried out, when the vehicle is being driven, by a torque sensor disposed on the steering column, the steering system comprising an assistance electric motor controlled by an on-board electronic processor, notably using the measurements of the torque on the steering wheel carried out by the torque sensor, the method consisting, when the instantaneous speed of the vehicle is higher than a predetermined threshold speed:

in identifying that, during a predetermined minimum period of time, the vehicle is being driven in a straight line, without torque exerted on the steering wheel by the driver of the vehicle;

if the preceding condition is met, in determining a mean residual torque on the steering wheel, notably by the calculation of a moving average of the measurements of the torque on the steering wheel;

if the mean residual torque on the steering wheel is higher than a predetermined minimum residual torque, in determining by calculation a correction, in particular proportional to this mean residual torque, for example a linear correction, to be applied to the measurements of the torque on the steering wheel;

in applying an effective correction, limited notably in speed of variation and in amplitude with respect to the correction determined by calculation, to the measurements of the torque on the steering wheel, the corrected measurements then being processed by the electronic processor in order to control the assistance electric motor.

The inventive step thus consists in carrying out a continuous auto-calibration of the "zero point" of the torque sensor on the steering wheel when the vehicle is being driven in a straight line. The method according to the invention allows, in a simple manner and without modifying the existing measurement means, any possible drift in the measurements of torque on the steering wheel to be compensated, and thus a good directional stability of the vehicle to be ensured, in particular at high speed, including on an inclined road.

According to one possibility, the vehicle is identified as being driven in a straight line, without torque exerted on the steering wheel by the driver of the vehicle, if the angular speed of the assistance electric motor is lower than a predetermined limiting speed, and/or if the rotation speed of the steering wheel is lower than a pre-determined limiting angular speed, and/or if the corrected measurements of the torque on the steering wheel are lower than a predetermined limiting torque.

Where necessary, the moving average of the measurements of the torque on the steering wheel is advantageously reset to the value "zero" whenever the vehicle is started.

The invention will, in any event, be better understood with the aid of the description that follows, with reference to the appended schematic drawing illustrating, by way of example, one embodiment of this method for correcting the measurements of the torque on the steering wheel.

Figure 1:
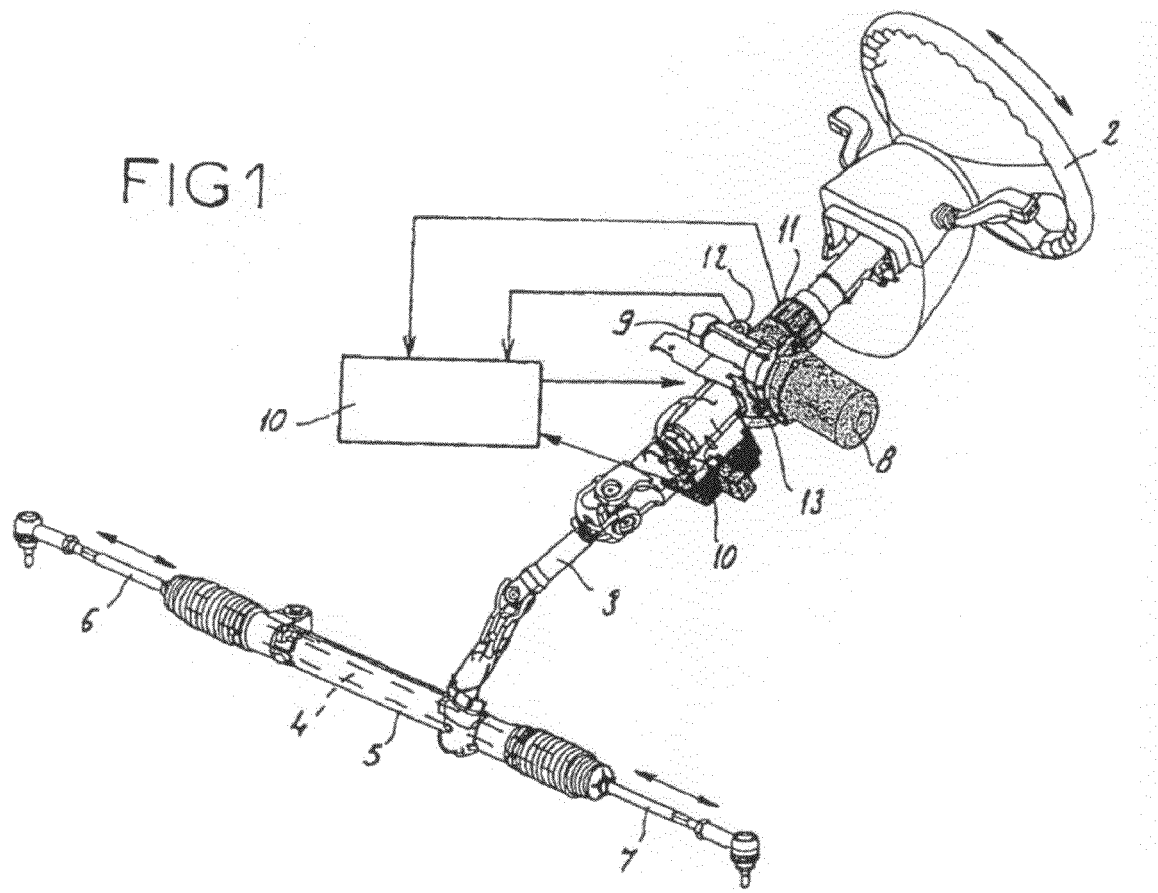
FIG. 1 shows a schematic perspective view of an electric power-assisted steering system capable of implementing the method of the invention.

FIG. 1 recalls what are the main elements composing an electric power-assisted steering system. Such a steering system comprises, on the one hand, a mechanical part comprising a steering wheel 2 linked in rotation to a steering column 3, whose far end from the steering wheel 2 carries a steering pinion set against a rack rail 4, mounted to allow sliding within a gear housing 5. The two opposing ends of the rack rail 4 are respectively linked, via connecting rods 6 and 7, to the right and left drive wheels (not shown) of the automobile vehicle in question.

In order to assist the manual effort exerted by the driver of the vehicle on the steering wheel 2, the steering system comprises an assistance electric motor 8, with two directions of rotation, whose exit shaft is coupled, via a speed-reducer gearing 9 notably with worm screw and gear wheel, to the steering column 3, so as to transmit a motor torque (which could also be a resisting torque) to this steering column 3. The assistance electric motor 8 is controlled by an on-board electronic processor 10, which receives and processes various signals coming from sensors. In a usual embodiment, the electronic processor 10 receives an electric signal coming from a sensor 11 of the angle of the steering wheel 2, representative of the instantaneous steering angle of the automobile vehicle in question, and this processor 10 also receives a signal coming from a torque sensor 12 placed on the steering column 3, and thus measuring the torque exerted by the driver on the steering wheel 2. In the example illustrated, a sensor 13 of the instantaneous position of the assistance electric motor 8 is provided. Using these various pieces of information, and possibly also using parameters external to the steering system, such as the speed of the vehicle, the electronic processor 10 controls the assistance electric motor 8 by defining, at each moment, an assistance torque or effort that can amplify or, on the contrary, compensate for the effort applied by the driver to the steering wheel 2, according to pre-defined "assistance laws".

Figure 2:
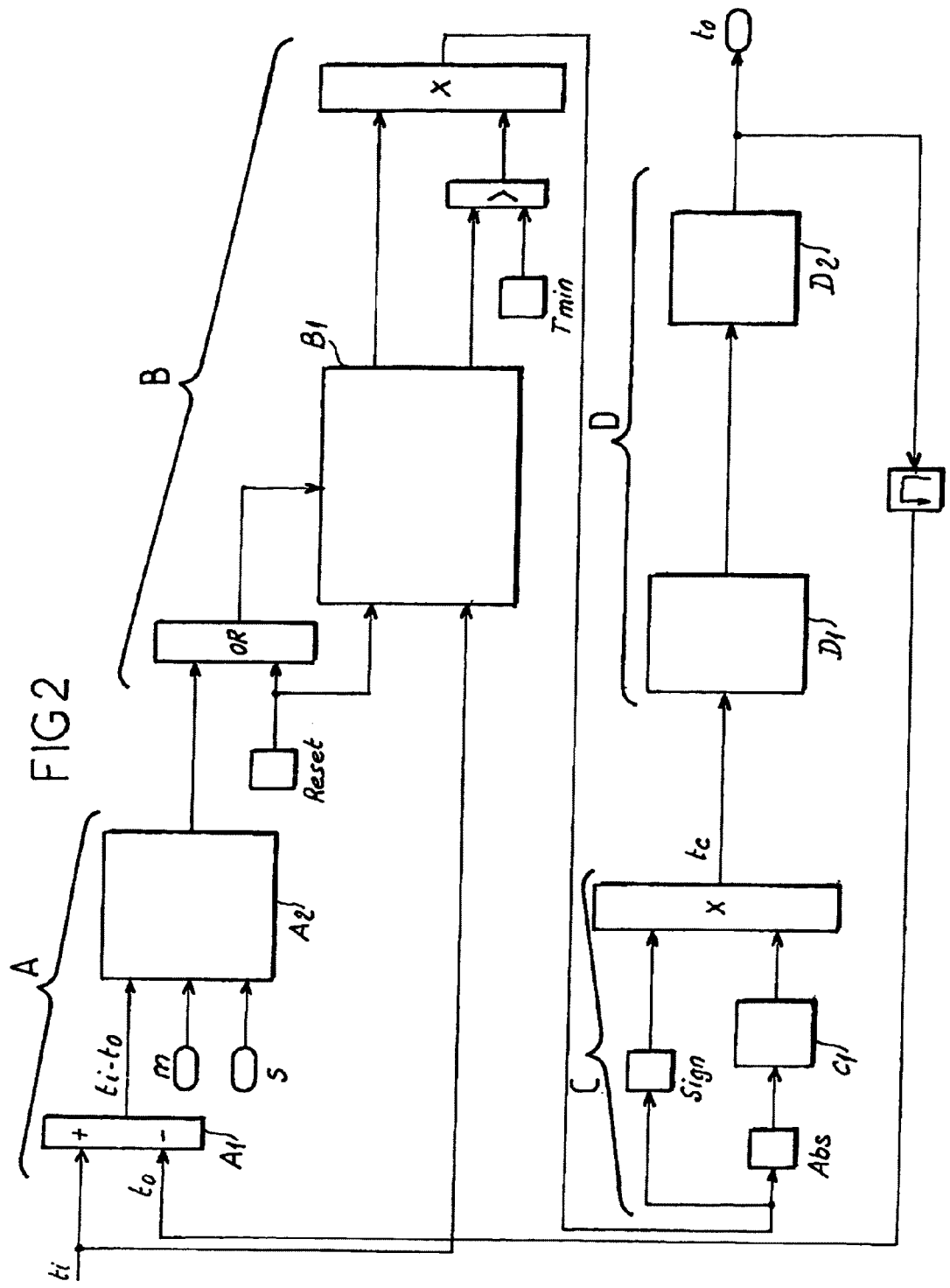
FIG. 2 is a block diagram that illustrates the complete method.

The invention more particularly relates to the processing of the signal supplied by the torque sensor 12. FIG. 2 shows a block diagram of an embodiment of the correction method according to the invention. A definition of the blocks A, B, C and D in this diagram is given hereinafter.

Within a first sub-assembly A1 of the block A, the measurements $t_i$ of the torque sensor 12 are corrected by a correction value $t_0$ for the measurements of the torque on the steering wheel 2, established by the method according to the invention.

A second A2 sub-assembly of the block A checks that, during a predetermined minimum period of time, for example one second:
- the corrected measurements ($t_i-t_0$) of the torque on the steering wheel 2 are lower than a predetermined limiting torque, for example 0.5 Nm;
- the angular speed m of the assistance electric motor 8 is lower than a predetermined limiting speed, for example 50 revs/minute;
- the instantaneous speed s of the vehicle is higher than a predetermined threshold speed, for example 20 km/h, except for "parking" conditions.

The conditions required in order to detect a vehicle being driven in a straight line, "parking" conditions excepted, are of course to be adapted for each vehicle. If these conditions are met, it is then possible to determine any drift of the measurements of the torque on the steering wheel 2. For this purpose, a second block B determines a mean residual torque $t_m$ on the steering wheel, notably by the calculation B1 of a moving average on the measurements $t_i$ of the sensor 12. It should be noted that the moving average of the measurements of the torque on the steering wheel is reset to the value "zero" each time the vehicle is started.

After a predetermined acquisition period $T_{min}$, for example 5 seconds, the mean residual torque $t_m$ thus calculated is transmitted to a block C. The block C checks that the mean residual torque $t_m$ thus calculated is higher than a minimum predetermined residual torque, for example 0.2 Nm (in absolute value), then it calculates, using a correction table C1, a correction $t_c$, proportional to this mean residual torque $t_m$, to be applied to the measurements of the torque sensor 12.

Figure 3:
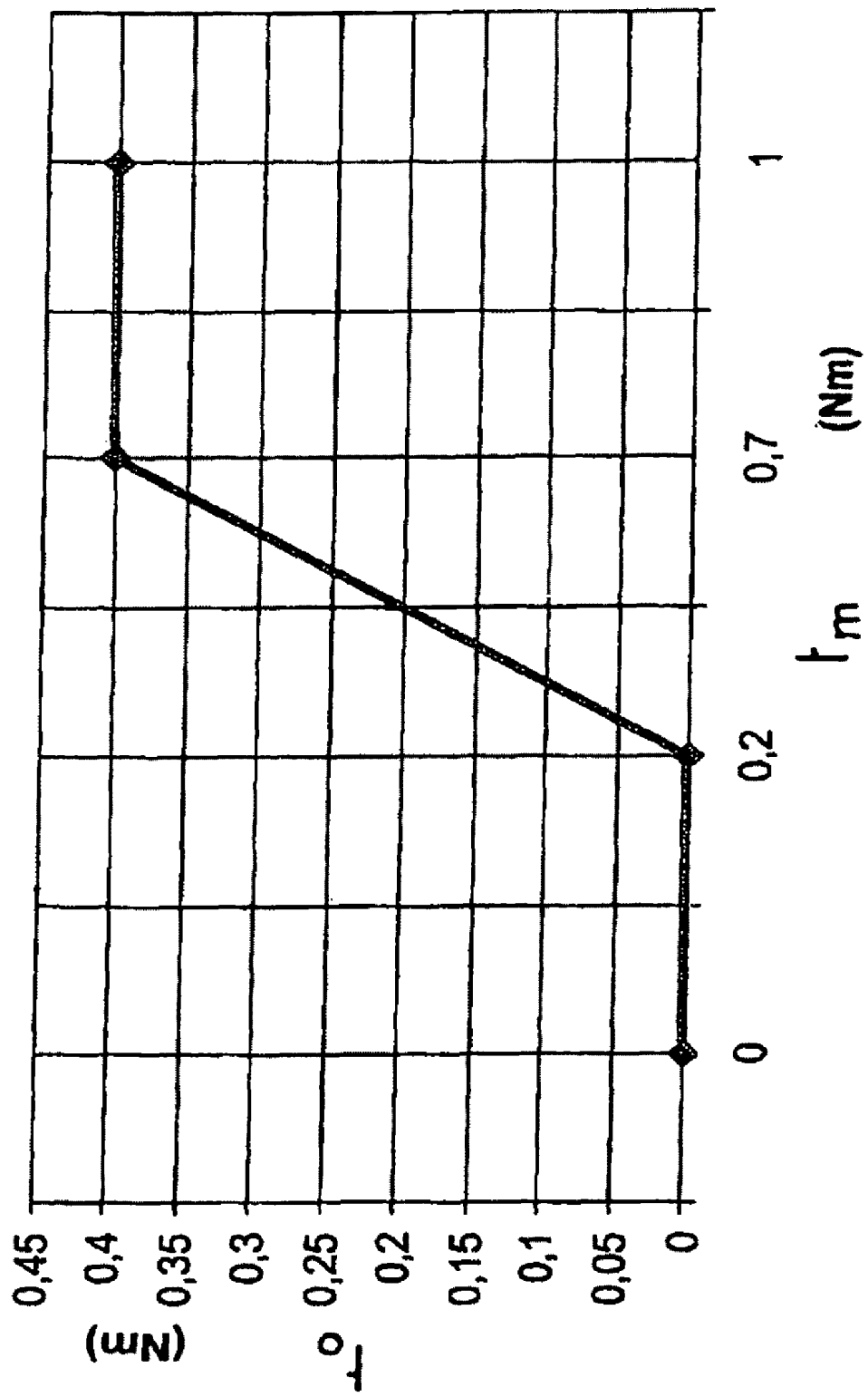
FIG. 3 is a graph showing a curve of the effective correction to be applied as a function of the mean residual torque on the steering wheel.

Lastly, within a block D, an effective correction $t_0$ (see FIG. 3), limited in speed of variation and in amplitude with respect to the calculated correction $t_0$, is applied to the measurements $t_i$ of the torque on the steering wheel, before they are processed by the processor 10.

In order to avoid a "threshold effect" on the handling of the steering wheel, a limitation D1 of the speed of variation of the effective correction $t_0$ is provided in order to keep this speed of variation always lower than a pre-determined maximum speed, for example 0.025 Nm/s. In addition, with a regard to safety and to reliability of the method, a limitation D2 of the amplitude of the effective correction $t_0$ is provided in order to keep this amplitude always lower than a pre-determined maximum amplitude, for example 0.4 Nm (see FIG. 3).

It goes without saying that the invention is not limited to the single embodiment of this correction method that has been described hereinabove, by way of example; on the contrary, it embraces all of the variant embodiments and applications of it that adhere to the same principle, within the framework of the appended claims. Thus, these embodiments and applications would not stray from the scope of the invention, notably whatever the particularities of the electric power-assisted steering concerned, the detail of the algorithm or the means of determination by the calculation implemented.

The invention claimed is:

1. A method for correcting measurements of a torque exerted on a steering wheel of a vehicle electric power-assisted steering system, carried out, when the vehicle is being driven, by a torque sensor disposed on a steering column, the vehicle electric power-assisted steering system comprising an assistance electric motor controlled by an on-board electronic processor using the measurements of the torque on the steering wheel that is measured by the torque sensor, when an instantaneous speed of the vehicle is higher than a predetermined threshold speed, the method comprising:
   identifying, during a predetermined minimum period of time, that the vehicle is being driven in a straight line, without torque exerted on the steering wheel by a driver of the vehicle, the vehicle being identified as being driven in the straight line when an angular speed of the assistance electric motor is lower than a pre-determined limiting speed;
   determining a mean residual torque on the steering wheel by calculation of a moving average of the measurements of the torque on the steering wheel;
   calculating, when the mean residual torque on the steering wheel is higher than a predetermined minimum residual torque, a correction proportional to the mean residual torque to be applied to the measurements of the torque on the steering wheel;
   applying an effective correction, limited in speed of variation and in amplitude with respect to the correction to the measurements of the torque on the steering wheel, the corrected measurements being processed by the electronic processor in order to control the assistance electric motor.

2. The correction method as claimed in claim 1, wherein the vehicle is identified as being driven in a straight line, without torque exerted on the steering wheel by the driver of the vehicle, when the angular speed of the assistance electric motor is lower than the pre-determined limiting speed, and when the corrected measurements of the torque on the steering wheel are lower than a predetermined limiting torque.

3. The correction method as claimed in claim 1, wherein the moving average of the measurements of the torque on the steering wheel is reset to zero whenever the vehicle is started.

4. The correction method as claimed in claim 2, wherein the moving average of the measurements of the torque on the steering wheel is reset to zero whenever the vehicle is started.

5. The correction method as claimed in claim 1, wherein the correction proportional to the mean residual torque is a linear correction.

6. The correction method as claimed in claim 1, wherein the vehicle is identified as being driven in a straight line, without torque exerted on the steering wheel by the driver of the vehicle, when the angular speed of the assistance electric motor is lower than the pre-determined limiting speed, when a rotation speed of the steering wheel is lower than a pre-determined limiting angular speed, and when the corrected measurements of the torque on the steering wheel are lower than the predetermined limiting torque.

* * * * *